Feb. 2, 1937.  C. TRCA  2,069,689
HEATER FOR AUTOMOBILE ENGINES
Filed May 7, 1936   2 Sheets-Sheet 1
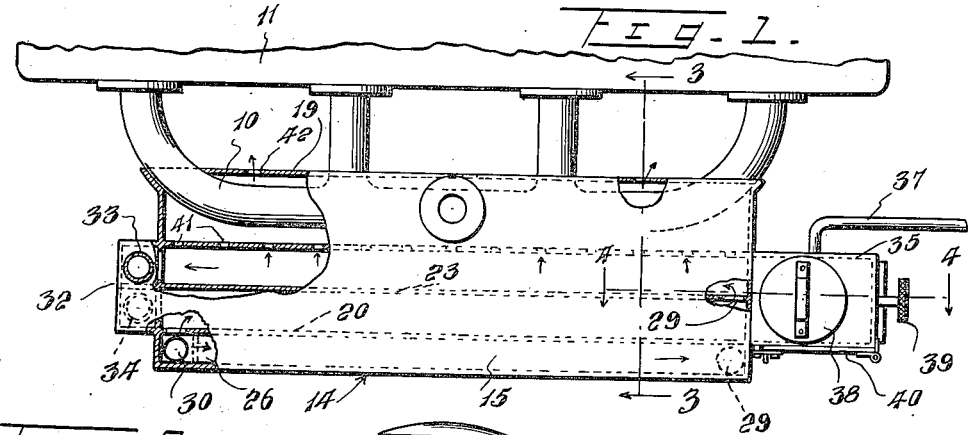
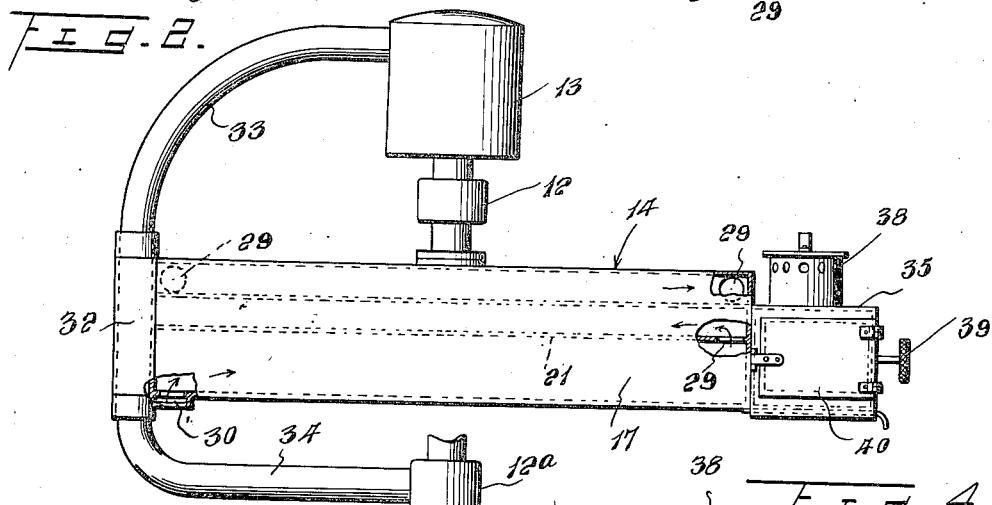
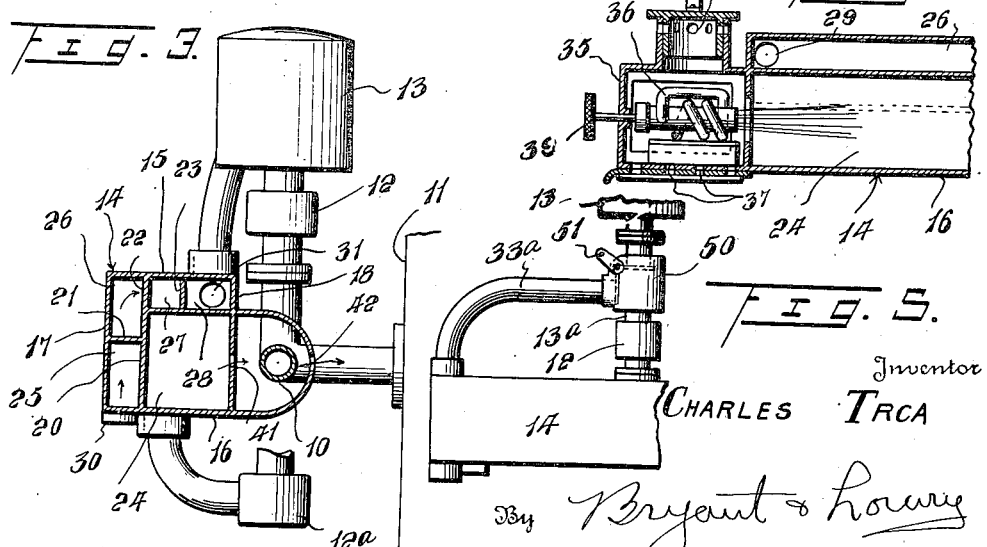
Inventor
CHARLES TRCA
By Bryant & Lowrie
Attorneys

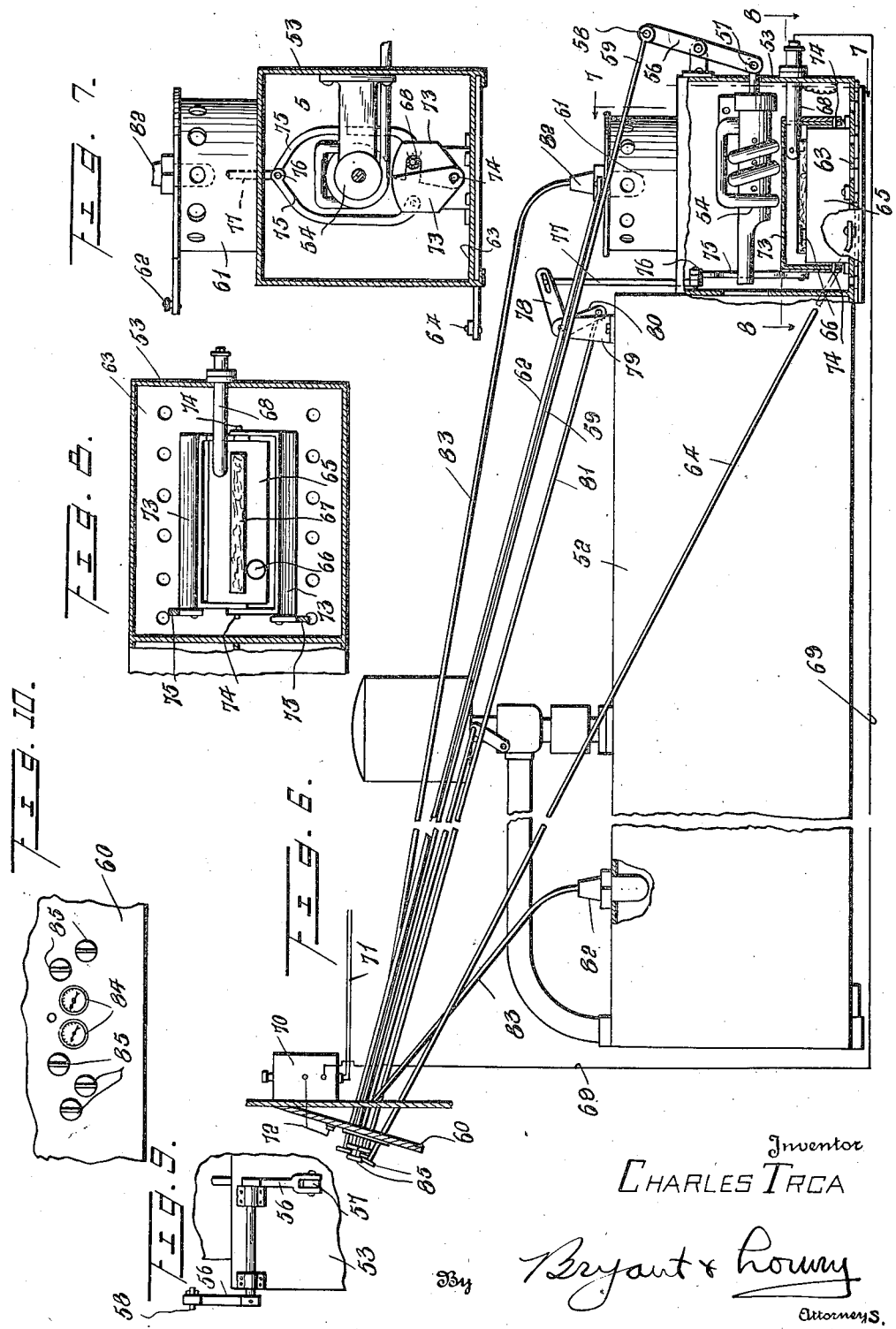

Patented Feb. 2, 1937

2,069,689

UNITED STATES PATENT OFFICE 2,069,689

HEATER FOR AUTOMOBILE ENGINES

Charles Trca, Pontiac, Mich.

Application May 7, 1936, Serial No. 78,512

6 Claims. (Cl. 123—122)

This invention relates to certain new and useful improvements in heaters for automobile engines.

The primary object of the invention is to provide a heater for automobile engines to aid in the starting of the engine during cold weather by means for effecting the flow of heated air over the intake manifold and to supply heated air to the air cleaner and carbureter.

A further object of the invention is to provide a heater of the foregoing character embodying a series of chambers having openings therein arranged in a manner to effect a circuitous flow of air with a heater, preferably in the form of a gasoline blow torch associated with one of the chambers and constituting the heating means, it being understood however that an electric heater may be also employed.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view, partly broken away and shown in section, of a heater for automobile engines and illustrated as associated with the intake manifold of the engine;

Figure 2 is a side elevational view of the heater showing the carbureter and air cleaner associated therewith, the same being partly broken away and shown in section;

Figure 3 is a cross-sectional view taken on line 3—3 of Figure 1, showing the several chambers of the heater;

Figure 4 is a detail sectional view taken on line 4—4 of Figure 1, showing the heater element in the form of a gasoline blow torch.

Figure 5 is a fragmentary side elevational view of another form of heater wherein the conduit for heated air is delivered to a pipe intermediate the usual air cleaner and carbureter;

Figure 6 is a side elevational view, similar to Figure 2, showing control devices for the blow torch burner of the heater, an alcohol lamp and control devices associated with the blow torch;

Figure 7 is a vertical sectional view taken on line 7—7 of Figure 6, showing the devices for extinguishing the flame of the alcohol lamp associated with the blow torch;

Figure 8 is a detail sectional view taken on line 8—8 of Figure 6;

Figure 9 is a fragmentary elevational view showing a part of the control mechanism for feeding fuel to the blow torch; and Figure 10 is a fragmentary elevational view of the instrument board of an automobile showing the control devices and temperature gages associated with the heater.

The heater is illustrated as associated with the intake manifold 10 of the internal combustion engine 11 and also the carbureter 12 and air cleaner 13 communicating with the carbureter. A second carbureter 12a is illustrated in Figure 2 so that the heater may be employed in connection with an automobile engine employing a single or double carburetion system.

The heater comprises an elongated casing 14 having top and bottom walls 15 and 16, an outer side wall 17 and an inner side wall 18, a housing 19 being carried by the inner side wall 18 and into which the intake manifold 10 is received. A series of longitudinally extending partitions 20, 21, 22, and 23 are formed in the casing 14 to provide chambers 24, 25, 26, 27, and 28, the chambers 25 to 28 bordering the chamber 24. The chambers 25 and 26 are positioned at the outer side of the casing 14, being superposed as shown in Figure 3, while the chambers 27 and 28 are arranged at the upper side of the casing. Openings 29 respectively arranged at opposite ends of the chambers 25 to 28 cause a circuitous flow of air through the chambers, air being supplied to the chambers by the inlet opening 30 at one end of the chamber 25. As shown in Figure 3, one end of the chamber 28 is provided with an opening 31 that communicates with a housing 32 at one end of the casing 14, a conduit 33 forming communication between the housing 32 and air cleaner 13 while a second conduit 34 forms communication between the housing 32 at the lower side thereof and the carbureter 12a. The chambers 25 to 28 border the chamber 24 but are not in air-flow communication therewith.

A heater, preferably of the gasoline blow torch type is associated with the chamber 24 of the casing 14 and includes a housing 35 carried by the end of the casing 14 opposite the housing 42, the housing 35 containing a blow torch 36 supplied with fuel by means of the pipe 36a that may extend to the main gasoline tank of the automobile or other container. To facilitate combustion, a vented slide 37 constitutes the bottom wall of the housing 35, while a vented cap 38 is carried by the upper end of the housing. The flame from the blow torch 36 projects into the chamber 24 as illustrated in Figure 4. The blow torch 36 is regulated by a control valve operated by a handle 39 and access to the blow torch is facilitated by a side door 40 hinged to the housing 35.

In the form of invention illustrated in Figure 5, the air cleaner 13 communicates with the carbureter 12 by means of the pipe 13a and said pipe has a valve device 50 set therein that communicates with the heater casing 14 by means of the conduit 33a. A valve in the valve device 50 is operated by the handle or lever 51 so that air from the cleaner 13 may be cut off and only heated air delivered to the carbureter 12 by way of the conduit 33a. The valve device may be regulated to admit both hot and cold air that is mixed before entering the carbureter 12 for regulating the temperature of air admitted to the carbureter and in extremely cold weather, the cold air through the air intake may be shut off entirely and only heated air passed through the valve device for delivery to the carbureter.

From the above detailed description of the invention, it is believed that the construction and use thereof will at once be apparent, it being noted that a series of openings 41 are formed in the inner wall 18 of the casing 14 to provide direct heat communication between the chamber 24 and the housing 19 that encloses the intake manifold 10 and the housing 19 is also provided with a series of openings 42 to permit the escape of heat units from the housing 19 in the direction of the engine 11. Air flows in a circuitous path through the chambers 25 to 28 that border the heated chamber 24 and the air is conducted to the cleaner 13 and carbureter 12 and 12a in a manner previously described. It is to be understood that other forms of heaters may be substituted for the gasoline blow torch 36. It is to be understood that the casing 14 and the conduit delivering the heated air to the air cleaner, pipe 13a and carbureter 12a may be covered with asbestos or other insulating material as well as other parts of the heater device for maximum efficiency in operation.

As shown in Figures 6 to 10, the gasoline blow torch that constitutes the heat producing element and also all of the elements associated therewith are controlled from the instrument board of the automobile, the reference character 52 designating a heater casing of the type shown in Figures 1 to 3 and having a housing 53 at one end thereof in which the blow torch 54 is mounted by means of the bracket 55 shown in Figure 7. The control of fuel to the blow torch 54 is accomplished by means of the lever 56 pivotally mounted exteriorly of the housing 53 with one end thereof connected as at 57 to a control valve on the burner 54 while the other end of the lever 56 is connected as at 58 with a push rod 59 that extends to the panel or instrument board 60 of the automobile. The upper end of the housing 53 carries a ventilator hood 61 controlled in its operation by means of the push rod 62 that extends to the instrument board 60. A ventilator slide 63 is carried by the bottom wall of the housing 53 and is controlled in its operation by a push rod 64 that extends to the instrument board 60.

An alcohol lamp is mounted in the bottom of the housing 53 beneath the burner 54 for ignition of the burner and includes a receptacle 65 having a filler opening closed by a plug 66 and an upwardly projecting burner wick 67. An igniter device 68 projecting through a wall of the housing 53 is associated with the wick 67 and being of an electrical character has a conductor wire 69 extending to the coil 70, the wires 71 of the coil leading to the battery, while the wire 72 from the coil leads to a switch button on the instrument board 60. The flame of the burner wick 67 is extinguished by means of a pair of shutters 73 pivotally mounted at their ends as at 74 to opposite ends of the fuel receptacle 65, a pair of curved links 75 being attached at their lower ends to the shutters 73 while the upper ends thereof are attached as at 76 to a single link 77 that has a pin and slot connection with the leg 78 of the bell crank lever that is mounted on a bracket 79 rising from the heater casing 52. The other leg 80 of the bell crank lever is attached to the push rod 81 that extends into the instrument board 60. Thermostatic elements 82 are associated with the housing 53 and heater casing 52 and have conduits 83 extending to the instrument board 60 for association with gages 84. The several push rods 59, 62, 64, and 83 have operating buttons 85 on the instrument board.

While there is herein shown and described the preferred embodiment of the invention, it is nevertheless to be understood that minor changes may be made therein without departing from the spirit and scope of the invention as claimed.

I claim:—

1. In a heater of the character described, a casing including a housing adapted to be placed in inclosing relation with respect to the intake manifold of an internal combustion engine for automobiles, said casing having a heater chamber therein and a circuitous chamber bordering the heater chamber, means forming communication between the circuitous chamber and carbureter for the engine, the heater chamber being in direct communication with the manifold, a housing at one end of the casing in communication with the casing, a gasoline blow torch in the housing and valve means for controlling admission of air to the housing, and a side door closure for the housing permitting access to the blow torch.

2. In a heater of the character described, a casing including a housing adapted to be placed in inclosing relation with respect to the intake manifold of an internal combustion engine for automobiles, said casing having a heater chamber therein and a circuitous chamber bordering the heater chamber, means forming communication between the circuitous chamber and carbureter for the engine, the heater chamber being in direct communication with the manifold, a housing at one end of the casing in communication with the casing, a gasoline blow torch in the housing and valve means for controlling admission of air to the housing, and said casing having heat outlet openings directed toward the engine.

3. In a heater of the character described, a casing including a housing adapted to be placed in inclosing relation with respect to the intake manifold of an internal combustion engine for automobiles, said casing having a heater chamber therein and a circuitous chamber bordering the heater chamber, means forming communication between the circuitous chamber and carbureter for the engine, the heater chamber being in direct communication with the manifold, a housing at one end of the casing in communication with the casing, a gasoline blow torch in the housing and valve means for controlling admission of air to the housing, a side door closure for the housing permitting access to the blow torch, and said casing having heat outlet openings directed toward the engine.

4. In a heater of the character described, the combination with an internal combustion engine having a carbureter, an air cleaner and a pipe forming communication between the air cleaner and carbureter, of a heater including a housing adapted to be placed in inclosing relation with respect to the intake manifold of the engine, said casing having a heating chamber in direct communication with the manifold and a circuitous chamber bordering the heating chamber, a conduit forming communication between the circuitous chamber and the pipe forming communication between the air cleaner and carbureter and a valve device in the pipe at the point of connection of the conduit for controlling the flow of heated air from the conduit and cold air from the air cleaner to the carbureter.

5. In a heater of the character described, a casing including a housing adapted to be placed in inclosing relation with respect to the intake manifold of an internal combustion engine for automobiles, said casing having a heating chamber therein in communication with the intake manifold, a housing at one end of the casing in communication with the heater chamber, a burner element in the housing, a lamp for igniting the burner element, means for extinguishing the lamp and control means therefor operable from the instrument board of the automobile.

6. In a heater of the character described, a casing including a housing adapted to be placed in inclosing relation with respect to the intake manifold of an internal combustion engine for automobiles, said casing having a heating chamber therein in communication with the intake manifold, a housing at one end of the casing in communication with the heater chamber, a burner element in the housing, a lamp for igniting the burner element, means for extinguishing the lamp and control means therefor operable from the instrument board of the automobile, and an igniter for the lamp operated from the instrument board.

CHARLES TRCA.